Dec. 27, 1949     C. GUAJARDO     2,492,860
VIBRATORY ELECTRICAL MOTOR
Filed May 31, 1947     3 Sheets-Sheet 1
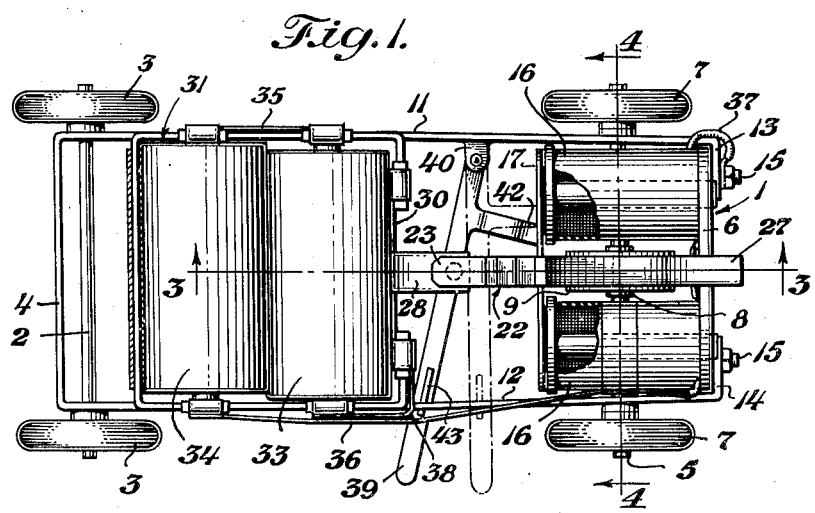
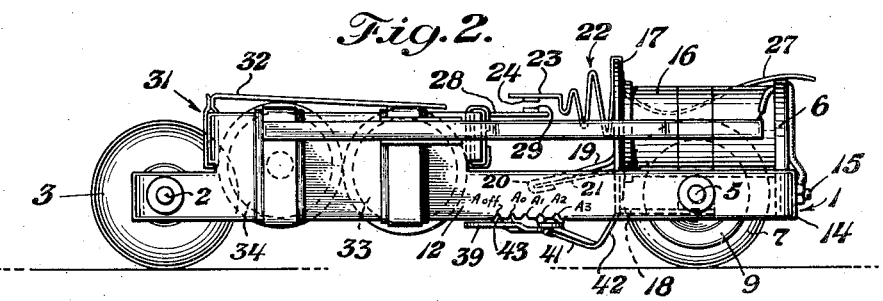
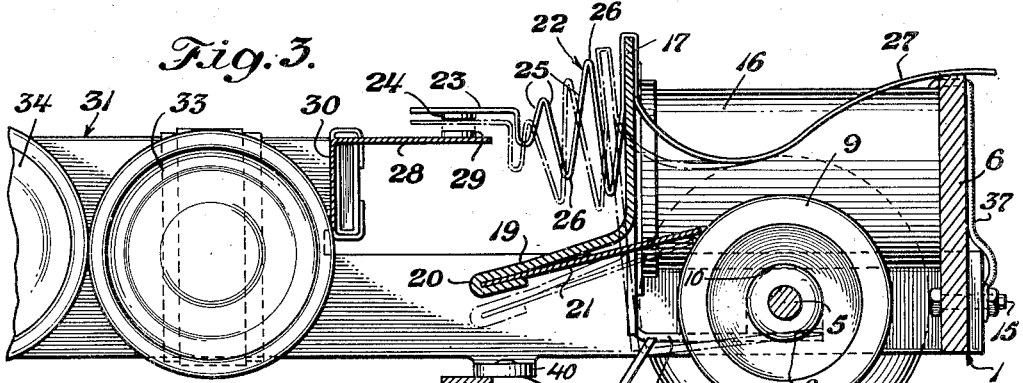
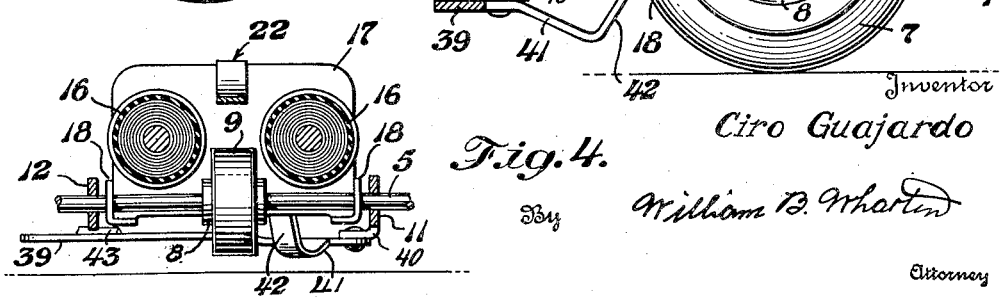
Inventor
Ciro Guajardo
By William B. Wharton
Attorney Dec. 27, 1949     C. GUAJARDO     2,492,860
VIBRATORY ELECTRICAL MOTOR
Filed May 31, 1947     3 Sheets-Sheet 2
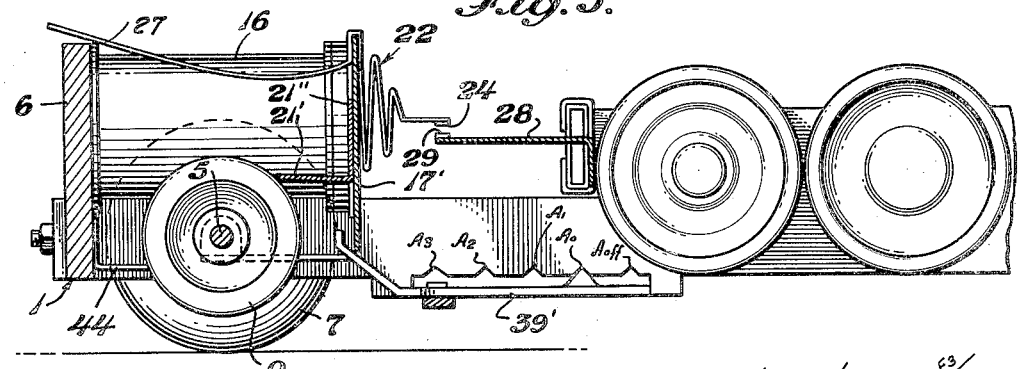
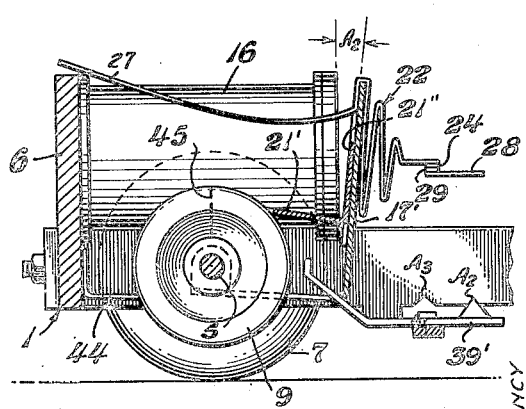
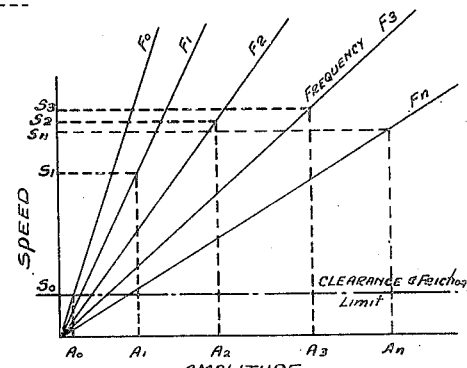
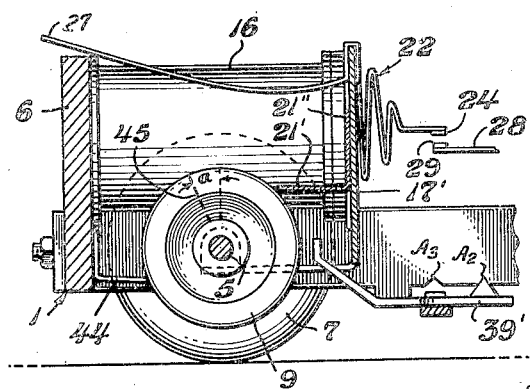
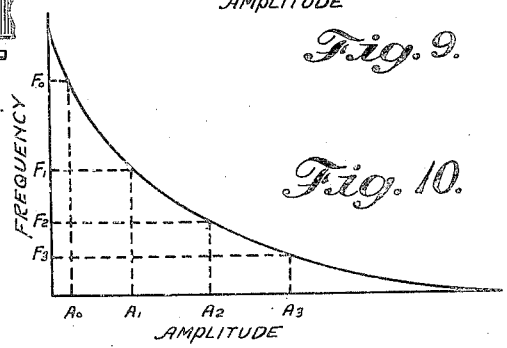
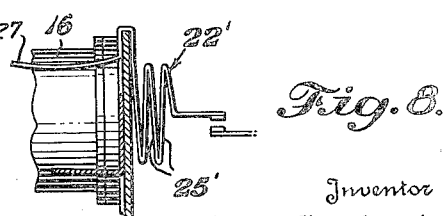
Inventor
Ciro Guajardo
By William B. Wharton
Attorney

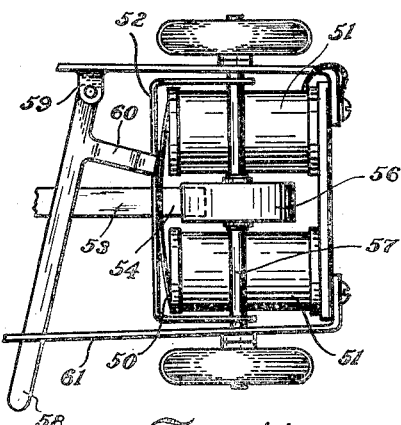
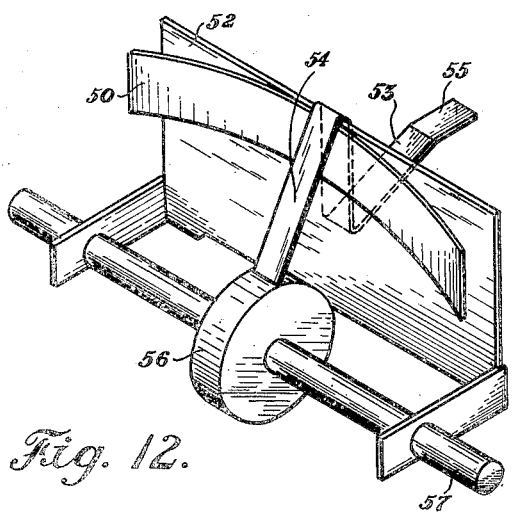
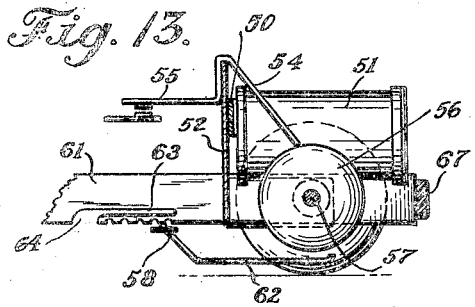
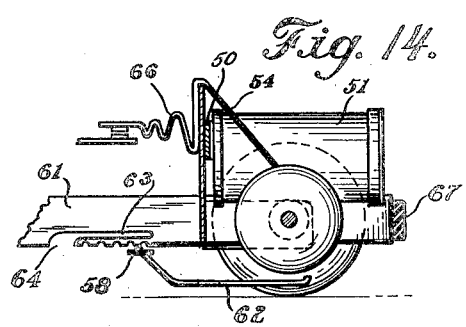
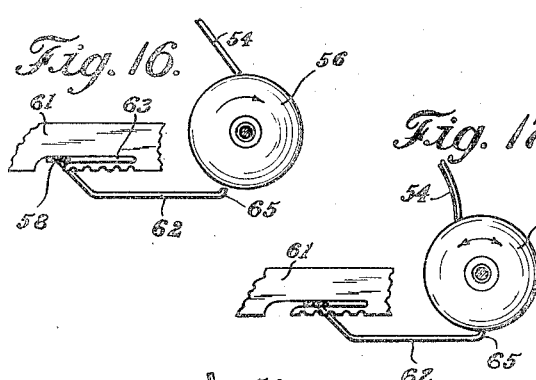
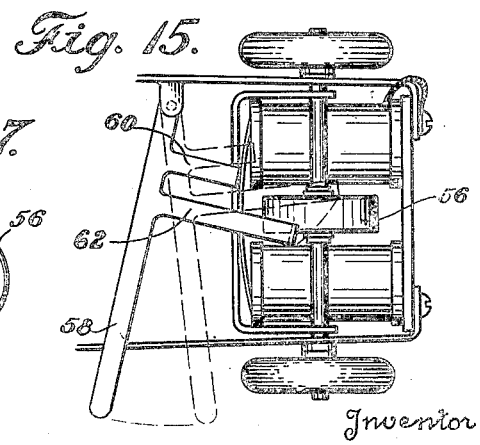
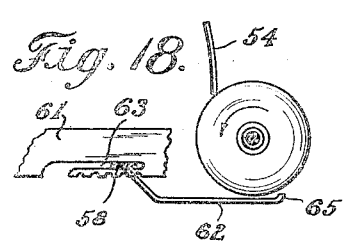

Patented Dec. 27, 1949

2,492,860

UNITED STATES PATENT OFFICE 2,492,860

VIBRATORY ELECTRICAL MOTOR

Ciro Guajardo, Wilkinsburg, Pa.

Application May 31, 1947, Serial No. 751,567

19 Claims. (Cl. 172—126)

This invention relates broadly to an electric motor for use in connection with toys such as toy vehicles, hoists, cranes, boats, airplanes and the like, and in fact, with any toy in which power from a rotating shaft may be utilized, or as the driving means for movie cameras, projectors and like instruments in which a simple and readily controllable motor is usable advantageously.

The primary object of the invention is to provide an electric motor for actuating toys and for other light work which is characterized by a vibrating member or armature, the vibratory motion of which is converted to rotary motion at different speeds without the use of gearing, or similar mechanical transmitting elements which would increase the complexity and cost of the article in which the motor is included.

A further object of the invention is to provide an improved type of control for electric motors characterized by a vibrating armature, said control comprising means movable to a plurality of positions and adapted to engage the armature and function as a switch for the motor circuit and to control the amplitude of vibration of the armature, or to perform either one of those functions.

A further object of the invention is to provide in an electric motor characterized by a vibrating armature, reversing means arranged so to act on the driving elements of the motor, by which propulsive force is delivered from said vibrating armature, that the effective direction of the propulsive force on such driving elements is reversed.

A further object of the invention is to provide in the above-noted motor assembly reversing means physically and functionally associated with the control means for controlling the vibration of the armature.

A still further object of the invention is to provide in the vibrating-armature motor a circuit breaker designed closely to follow the frequency of the vibrating armature of the motor, and thus to assure smooth power delivery from the motor.

Other and further objects of the invention will become apparent as the description proceeds, reference being made to the accompanying drawings forming a part of the present disclosure, wherein, for purposes of illustration our electric motor is shown as applied to a toy vehicle, and wherein:

Fig. 1 is a top plan view of the motor and toy vehicle associated therewith, parts being broken away.

Fig. 2 is a side elevational view of the motor and toy vehicle of Fig. 1, with the two wheels on the near side of the vehicle removed for clarity of illustration.

Fig. 3 is an enlarged sectional view taken along the line 3—3 of Fig. 1 looking in the direction of the arrows, this figure illustrating one type of undulative circuit breaker and one arrangement of the pawl or driving knife.

Fig. 4 is a sectional view taken along the line 4—4 of Fig. 1 looking in the direction of the arrows.

Fig. 5 is a fragmentary sectional view of a motor and toy vehicle illustrating a modified arrangement of the pawl or driving knife, and a stationary knife that may be provided to prevent undesired reverse movement of the driving wheel or ratchet.

Fig. 6 is a fragmentary sectional view similar to Fig. 5 showing the driving and control elements in operative relation during one cycle with the contacts closed, and indicating by the heavy dotted line an arbitrary starting position for the ratchet or driving wheel.

Fig. 7 is a fragmentary sectional view similar to Fig. 6 showing the contacts broken and the armature drawn back, with the driving knife or pawl at the end of its stroke, the heavy and light dotted lines indicating the angle through which the ratchet or driving wheel has been turned.

Fig. 8 is a fragmentary sectional detail view of a modified form of undulative circuit breaker that may be used with the motor.

Figs. 9 and 10 are graphs showing the relation between speed and frequency with respect to amplitude in motors constructed in accordance with Figs. 1 to 8 inclusive.

Fig. 11 is a bottom plan view showing a modified form of circuit breaker and driving elements associated with the vibrating armature of the motor.

Fig. 12 is an isometric detail view of the modified circuit breaker and driving elements shown in Fig. 11.

Fig. 13 is a fragmentary longitudinal sectional view showing a circuit breaker and driving elements included in a toy automobile illustrative of the utilization of the motor, and showing reversing means associated with the switch and speed control means of the motor.

Fig. 14 is a view similar to Fig. 13 but showing a further modification in which the driving elements and reversing means of Figs. 11 to 13 inclusive are combined with a circuit breaker formed as in Figs. 1 to 7 inclusive.

Fig. 15 is a fragmentary bottom plan view corresponding generally to the showing of Fig. 13, illustrating the action of the reversing means associated with the control means of the motor.

Figs. 16, 17 and 18 are schematic views illustrating successive stages in reversing the driving elements of the motor.

In order to illustrate one practical application of the electric motor, as well as the structural details of the motor itself, I have chosen to illustrate the motor as it might be applied to a toy vehicle, such as a toy automobile.

In doing this, the main frame 1 of the motor has been so designed that it may be supported for movement by means of an axle 2 carrying wheels 3 and pivotally mounted adjacent a rear cross-piece 4 of the frame 1, and the driven shaft 5 of the motor is pivotally mounted on the frame 1 near a forward cross-piece 6 thereof, and wheels 7 are suitably keyed or otherwise secured to the shaft 5 for rotation therewith.

As shown in Figs. 1 to 8 inclusive, the shaft 5 is enlarged centrally thereof as indicated at 8, and a solid rubber wheel or ratchet 9 having a relatively small central opening 10 is forced onto this enlarged portion 8 of the shaft 5 whereby to provide a frictional driving engagement between the rubber ratchet 9 and the metal shaft 5. This frictional driving engagement is such as to positively transmit all power developed by the motor, but is also such that excessive power applied to the shaft 5 in the reverse direction will permit reverse rotation of the shaft without rotation of the ratchet 9 which will be held against reverse rotation by its operating knife or pawl and/or a stationary knife, both of which will be later described.

Still with reference particularly to Figs. 1 to 8 inclusive, the main frame 1, in addition to the cross-pieces 4 and 6, comprises side pieces 11 and 12, preferably integral with the cross-piece 4, and having inturned forward ends 13 and 14, respectively, to which the cross-piece 6 is secured as by means of bolts 15.

A pair of spaced electromagnets or coils 16 is secured to the cross-member 6, the axes of the coils extending longitudinally of the frame 1. The coils 16 cooperate in a well known manner to actuate an armature 17 pivotally mounted on the frame, as by means of a pair of integral brackets or arms 18 pivoted on the shaft 5, and extending outwardly at approximately right angles from the plane of the armature at the lower corners thereof.

A lower central portion of strip 19 of the armature 17 is bent outwardly and rearwardly, and the end 20 thereof is folded to receive a driving knife or pawl 21 which actuates the ratchet wheel 9. The pawl 21 may be welded or otherwise suitably secured to the folded end 20 of the strip 19.

Referring more particularly to Figs. 2 and 3, a folded or undulative circuit breaker 22 embraces and is secured to the upper edge portion of the armature 17. The free end 23 of the circuit breaker 22 is provided with a contact point 24, and the folds or undulations 25, or the lengths 25 of the circuit breaker between reverse bends 26, increase progressively in length from the free end 23 toward the armature.

Fig. 8 illustrates a modified form of the folded or undulative circuit breaker 22. The circuit breaker 22′ illustrated in this figure is exactly the same as the circuit breaker 22, except that the folds or undulations 25′ are each of substantially the same length, instead of changing progressively in length as do the undulations 25.

Circuit breakers 22 and 22′ are preferably made of spring metal and hence are expansible and compressible and each forms in effect a "telescope" or "accordion" spring.

A return spring 27, preferably integral with the circuit breaker 22, curves downwardly between the coils 16 and then upwardly to rest slidably on the top edge of the cross-member 6 of the frame 1.

A contact element 28 supported by, but insulated from, the frame 1, is provided with a contact point 29 cooperating with the contact point 24 of the circuit breaker 22.

The contact element 28 is T-shaped in plan view and the cross bar 30 thereof is at right angles to the leg of the T and forms a forward wall of a battery box 31, otherwise formed integrally with the frame 1 except for a cover 32. The battery box illustrated is adapted to hold two batteries 33 and 34, connected in series.

The electric circuit and the flow of current therethrough is as follows:

Battery 33 through conductor 35, insulated from the frame, to battery 34. From battery 34 through conductor 36, insulated from the frame, to the coils 16 which are connected in parallel. From the coils 16 through conductor 37 to one of the bolts 15 and frame member 6 and thence to the armature return spring 27. From the spring 27 through the circuit breaker 22, contact 24, contact 29, contact element 28 and 30, and through conductor 38, insulated from the frame and conductor 36, back to the battery 33.

The operation of the motor is the same as the usual "Buzzer" which operation is so well known that it is not believed necessary to repeat it here. It may be noted, however, that with each vibration of the armature, the pawl 21 drives the ratchet 9, and in the embodiment illustrated, the wheels 7, through a small angle, thus imparting movement to the toy vehicle or other toy or driven structure in which the motor is included. This motor also possesses a distinctive feature in which it differs radically from "Buzzer" motors of usual sort. That feature resides in the control element of the motor, which acts as a speed control as well as performing the function of a switch.

A control lever 39 is pivotally connected at one end to a lug 40 extending inwardly from the lower edge of the frame member 11 adjacent the armature 17. An arm 41, preferably integral with the lever 39, projects forwardly from the said lever, and the arm 41 is provided with a forwardly and upwardly inclined end portion 42 extending upwardly behind a lower edge portion of the armature 17 and adapted to engage the same to either maintain the armature against the relays, in which case the circuit is maintained open at the contacts 24 and 29 as illustrated in Fig. 2, or to limit the amplitude of vibration of the armature, as illustrated in Fig. 3.

The control lever 39 extends slightly beyond the frame member 12, and the lower edge of the member 12 is notched as indicated in $A_{off}$, $A_0$, $A_1$, $A_2$, and $A_3$, to receive a keeper 43 provided on the upper surface of the control lever 39.

With the control lever 39 in the $A_{off}$ position, the electric circuit is maintained open, and hence the lever 39 functions as a switch means. Assuming that the motor is to be placed in operation, the control lever may be moved initially into the first notch A₀. In that position of the control lever, the armature 17 is moved away sufficiently from the coils 16 to permit the contacts 24 and 29 to close and thus to cause vibratory movement of the armature. The amplitude of movement is, however, so slight that knife or pawl 21 does not rotate ratchet wheel 9. This gives a realistic "idling" effect as the motor operates. In the next notch A₁ the separation of the armature from the coils and amplitude of the vibration are increased sufficiently to cause knife or pawl 21 to impart low speed propulsion to ratchet wheel 9, and so following. With respect to the speed control position indicated for the control lever 39, attention is directed to the graphs illustrated in Figs. 9 and 10.

These graphs show the relationship between speed and frequency with respect to amplitude, but it should be understood that the graphs express a general relationship not necessarily reduced to numerical value.

With the control lever 39 positioned in the A₀ position, corresponding to amplitude A₀, the amplitude of armature movement is merely sufficient to balance clearance and friction and there is no movement of the driving wheel or ratchet 9.

With the control lever 39 in the position A₁, corresponding to increased amplitude A₁, the frequency is decreased, but a substantial speed of the ratchet 9 is obtained.

With the control lever 39 in the position A₂, corresponding to increased amplitude A₂, the frequency is further decreased but the speed of the ratchet 9 is higher than at amplitude A₁.

With the control lever 39 in the position A₃, corresponding to amplitude A₃, the speed of the ratchet 9 is not substantially greater than at amplitude A₂ because the decrease in frequency at this point tends largely to counteract the increase in amplitude.

In the motor disclosed herein, advantage is taken of the relationship just described to provide a very realistic control for toy vehicles and other toy machines, without the use of clutches, gearing, or other mechanical elements which would not only greatly increase the cost of the toy, but would also decrease the efficiency of the drive and shorten the life of the batteries associated with the toy and add additional elements to become broken or distorted.

It is readily apparent that control lever 39, or equivalent control structure is capable of serving simply as a switch, without functioning as an amplitude control, also, it is capable of acting simply to limit the amplitude of armature vibration, additional switching means of some well known sort being provided to open and close the energizing circuit for the electromagnetic coils.

Figs. 5, 6 and 7 illustrate primarily a modified form of pawl. The pawl 21' is positioned between the relays 16 and has an angular position 21'' by means of which it is secured directly to the forward face of the armature 17'. This construction reduces weight beyond the armature from the pivot point thereof and hence the armature action is rendered more lively.

Additionally, a stationary knife 44 is secured to the cross-member 6 of the frame 1 and engages the ratchet 9 to prevent reverse movement thereof as well as the wheels 7. The knife 44 functions, for example, to check reverse movement of the toy vehicle when it is moving up a grade so that there is a reverse pull of gravity between impulses of the driving knife or pawl. Similarly, the knife 44 would prevent reverse movement of the shaft 5 if the motor were being used to operate a hoist or crane.

Fig. 5 illustrates the operative position of the driving and control elements with the control lever 39' positioned in its A₀, or motor-idling, position.

Fig. 6 shows the driving and control elements in operative relation during one cycle with the contact 24 of the undulative circuit breaker and the contact 29 of the contact element 28, closed, and indicating by the heavy dotted line 45 an arbitrary starting position for the wheel, the control lever 39' being positioned in notch A₂ corresponding to amplitude A₂.

Fig. 7 shows the contacts 24 and 29 broken and the armature 17' drawn back, with the driving knife 21' at the end of its stroke. The line 45 is shown as having moved through an angle $a$ which measures the impulse given the wheel or ratchet 9 in that cycle.

All of the foregoing is based more particularly on Figs. 1 to 8 of the drawings in which the circuit breaker of the motor has a "telescope" or "accordion" formation and in which the knife or pawl providing the ultimate driving element which acts on the rubber ratchet wheel of the motor extends at approximately right angles to the plane of the armature. There are certain advantages attendant upon the use of the telescope or accordion spring circuit breaker. Such advantages rise from the fact that such undulative circuit breaker is less rigid than a simple curved or inclined contact spring and exhibits a lesser tendency to resonance in its vibration, to establish a frequency of its own rather than to follow the frequency of the armature vibration. The undulative circuit breakers 22 and 22' both tend to follow the frequency of the armature vibration and hence to avoid jerky action of the motor drive such as is caused by a resonant frequency of the contact breaker itself. In addition to the smoothness of power delivery, undulative circuit breakers such as the circuit breakers 22 and 22' tend to give a marked and positive amplitude and speed control with different positions of the control lever.

As between the undulative circuit breaker 22 shown in Figs. 1 to 7 inclusive of the drawings and the circuit breaker 22' shown in Fig. 8 the former is preferred because of the fact that the inertia of the accordion spring increases in measure with the length of the folds or undulations and decreases toward the center of rotation at the center of the shaft 5. In circuit breaker 22 the undulations are of progressively decreased length outwardly from the center of rotation, whereby the inertia is relatively uniform for the various frequencies and amplitudes of armature vibration.

It has been found that smooth power delivery can be obtained also by use of a circuit-breaking spring of a simpler form and by utilizing a different form of return spring and a different positioning of the driving knife or pawl with respect to the armature and the ratchet wheel on which the knife or pawl acts. Referring to Figs. 11 and 12 of the drawings, it will be seen that the return spring may comprise a simple strip of nonmagnetic spring metal 50 interposed between the heads of coils 51 and armature 52 and bowed outwardly toward the armature. The circuit breaker may be of simplified form, comprising a single spring member 53 bent outwardly from the base of the armature and upwardly to a substantially horizontal contact terminal 55. Knife or pawl 54, which desirably is a continuation of circuit breaker spring 53, extends over the top of armature plate 52 and downwardly into contact with rubber ratchet wheel 56. That ratchet wheel, unlike the ratchet wheel shown in Figs. 1 to 8 inclusive of the drawings, is mounted rigidly on a drive shaft 57.

With the bowed spring interposed between the armature and the coils there is less decrease in the frequency of armature vibration with increase in amplitude because residual magnetism is lessened. With the over-hand positioning of the driving knife or pawl it is unnecessary to prevent reversed rotation of ratchet wheel 56, because such rearward rotation does not injure knife or pawl 54. In fact reversed rotation of the ratchet is resisted by the pawl until it yields flexibly to "snap" over center and thus assume a different position with respect to the ratchet, whereupon it may then operate to impart a reverse propulsion to drive shaft 57 and to vehicle wheels or other elements mounted on it. By giving a rearward impulse to the vehicle, or to the ratchet wheel, reversed operation of the motor can be produced simply by changed position of the driving knife or pawl.

As in the structure of Figs. 1 to 8 inclusive, a control lever 58 performs the dual functions of a switch and a positive control of the amplitude of armature vibration. This control lever 58 similarly is pivoted to fixed structure such as the vehicle frame at 59 and has an arm 60 which engages the lower edge of armature 52 to limit swinging movement of the armature about its pivoted mounting on drive shaft, or axle, 57. Similarly to the form of the motor shown in Figs. 1 to 8, control lever 58 engages a similar series of notches in the lower edge of frame member 61 of the vehicle to give a plurality of amplitude regulations in the armature vibration from a switched-off position to a position of maximum amplitude.

In order to provide in association with such control means, means for reversing the effect of motor operation a second arm 62 is extended forwardly from control lever 58 normally to lie beneath and close to the periphery of ratchet wheel 56. Above the row of regulating notches for control lever 58 a slot 63 is formed to extend forwardly from its entrance way 64. To reverse the direction of motor operation, control lever 58 is moved upwardly in way 64 into slot 63 (see Fig. 16) and moved forwardly. Upward movement of the control lever in bringing it into slot 63 and forward movement of the lever in the slot bring the upturned terminal 65 of arm 62 into contact with the periphery of ratchet 56, momentarily to check movement of the ratchet and to give it a slight initial reverse movement as arm 62 moves forwardly and across the edge of the ratchet being shown by broken lines in Fig. 15, and the effect of this movement of the arm and the wheel on the driving knife or pawl will be understood upon considering Figs. 16, 17 and 18 in sequence.

Referring initially to Fig. 16, the motor is still shown in forward operation, with the control lever lifted into registry with slot 63 and with the terminal 65 of arm 62 elevated to be brought into effective contact with the edge of ratchet wheel 56 but still out of operative contact with the ratchet wheel. It will be noted from the arrow appearing in this figure of the drawings that the direction of rotation of ratchet 56, which is a direction of forward propulsion for the vehicle, is caused under the positive movement of armature 52 in which the armature is attracted toward the heads of coils 51. Knife or pawl 54 rides idly as the armature moves away from the coils under the influence of return spring 50.

Fig. 17 shows the instant at which the upturned terminal 65 of arm 62, in moving from left to right, comes into contact with the periphery of ratchet wheel 56, the forward movement of the ratchet wheel having been checked and reversed movement as yet not having been caused.

Fig. 18 shows the position of driving knife or pawl 54 after the terminal 65 of arm 62 has moved along and across the peripheral edge of ratchet wheel 56 and then out of contact with the periphery of the ratchet wheel, such movement having produced a slight initial reversed movement of ratchet wheel 56, which brings the knife into a position for reversed action to rotate the ratchet wheel in the direction of the arrow in Fig. 18. In this position of the elements reverse rotation is produced under the influence of return spring 50 after each positive impulse in which the armature is drawn to the coils, and knife or pawl 54 rides idly on the periphery of the ratchet wheel during the positive or attractive movement of the armature.

It readily will be understood that movement of control lever 58 rearwardly in slot 63 to entrance way 64 restores the driving knife or pawl 54 to the driving position shown in Fig. 16, control lever 58 being moved downwardly and into a propulsive position along the notched edge of the frame member and arm 62 being carried with it out of contact with the periphery of the ratchet wheel, so that forward movement again takes place under the attractive force of coils 51.

A combination of the features described in connection with Figs. 1 to 8 of the drawings with those described with reference to Fig. 12 and the following figures of the drawings is shown in Fig. 14. In that figure of the drawings, the overhand position of driving knife or pawl 54 and the bowed return spring 50 are shown in conjunction with a telescope or accordion spring circuit breaker 66 similar to the undulative circuit breaker spring 22 of Figs. 1 to 7 inclusive. This arrangement combines the advantages of the over-hand mounting of the knife or pawl which permits reverse movement of the ratchet wheel and the decrease in residual magnetism caused by the use of bowed spring 50 with the advantageous features attendant upon the use of the undulative circuit breaker. As shown, a reversing arm 62 and associated elements as shown in Fig. 13 also are included.

It has been explained above that reversal in the action of the motor may be obtained simply, but less realistically than by the movement of the control levers, by giving a reverse impulse to the wheels of the vehicle or to the ratchet wheel manually. Means for causing initial reverse impulse bringing the driving knife or pawl into position for reversed operation is shown in Figs. 13 and 14 as a resilient bumper 67 of rubber or like material mounted on the forward end of the toy vehicle frame or body. Under the reaction to the compression of such resilient bumper when the vehicle strikes a solid body, slight initial reverse movement is given to the ratchet wheel to bring the driving knife or pawl into the position shown in Fig. 18 and thus to cause reversed action of the motor.

In the above description, I have set forth several of the preferred embodiments of my invention, but it is to be understood that these are given merely by way of illustration, and not in limitation thereof.

I claim as my invention:

1. In an electric motor comprising a pivoted armature and an electric circuit including an electromagnetic coil arranged to act on said armature, a resilient circuit breaker secured to the armature, and a contact element cooperating with the circuit breaker to make and break said circuit; a movable control means adapted to engage said armature and maintain the same in a position holding said circuit breaker out of contact with said contact element, whereby said circuit may be maintained open.

2. In an electric motor comprising a pivoted armature and an electric circuit including an electromagnetic coil arranged to act on said armature, a circuit breaker secured to the armature, and a resilient contact element cooperating with the circuit breaker to make and break said circuit; control means movable to a plurality of positions adapted to engage said armature, said control means in one of said positions holding said circuit breaker out of contact with said contact element whereby said circuit may be maintained open and said control means in other of its said plurality of positions regulably limiting the amplitude of vibration of said armature.

3. In an electric motor the combination of an electric circuit including an electromagnetic coil and a contact element, a frame, an armature pivotally mounted on said frame and acted on by said coil, a circuit breaker mounted to coact with said armature and cooperating with said contact element to make and break said circuit, a shaft rotatably mounted in said frame, a ratchet mounted on said shaft, a pawl secured to said armature adapted to coact with said ratchet to cause rotation of said shaft, and a movable control means operatively associated with the said armature adapted to engage and maintain the same in a position holding said circuit breaker out of contact with said contact element to hold said circuit open.

4. In an electric motor the combination of an electric circuit including an electromagnetic coil and a contact element, a frame, a pivotally mounted armature acted on by said coil, a resilient circuit breaker mounted to coact with said armature and cooperating with said contact element to make and break said circuit, a shaft rotatably mounted on said frame, a ratchet mounted on said shaft, a pawl movable with said armature and adapted to coact with said ratchet to cause rotation of said shaft, and a controller movable to a plurality of positions mounted on said frame, said controller engaging said armature in one of said positions to hold said circuit breaker out of contact with said contact element whereby said circuit is maintained open and said controller in other of its plurality of positions limiting the amplitude of vibration of said armature.

5. In an electric motor the combination of an electric circuit including an electromagnetic coil and a contact element, a frame, a pivotally mounted armature acted on by said coil, a resilient circuit breaker mounted to coact with said armature and cooperating with said contact element to make and break said circuit, a shaft rotatably mounted on said frame, driving means actuated by said armature to rotate said shaft, and a controller arm mounted on said frame and movable to a plurality of positions, said arm engaging said armature for controlling the operation thereof.

6. In an electric motor the combination of an electric circuit including an electromagnetic coil and a contact element, a frame, a pivotally mounted armature acted on by said coil, a resilient circuit breaker mounted to coact with said armature and cooperating with said contact element to make and break said circuit, a shaft rotatably mounted on said frame, a ratchet mounted on said shaft, a pawl movable with said armature adapted to coact with said ratchet to cause rotation of said shaft, and a controller operatively associated with the said armature mounted on said frame and movable to a plurality of positions regulably limiting the amplitude of vibration of said armature.

7. In an electric motor the combination of an electric circuit including an electromagnetic coil and a contact element, a frame, a pivotally mounted armature acted on by said coil, a resilient circuit breaker mounted to coact with said armature and cooperating with said contact element to make and break said circuit, a shaft rotatably mounted on said frame, a ratchet mounted on said shaft, a pawl movable with said armature adapted to coact with said ratchet to cause rotation of said shaft, said pawl being susceptible of changed positions with respect to said ratchet to produce rotation of the said shaft in either of its two rotational directions, and a controller movable to a plurality of positions mounted on said frame, said controller engaging said armature in one of said positions to hold said circuit breaker out of contact with said contact element whereby said circuit is maintained open and said controller in other of its said plurality of positions limiting the amplitude of vibration of said armature.

8. In an electric motor the combination of an electric circuit including an electromagnetic coil and a contact element, a frame, a pivotally mounted armature acted on by said coil, a resilient circuit breaker arranged to coact with said armature and cooperating with said contact element to make and break said circuit, a shaft rotatably mounted on said frame, a ratchet mounted on said shaft, a pawl movable with said armature adapted to coact with said ratchet to cause rotation of said shaft, said pawl being susceptible of changed positions with respect to said ratchet to produce rotation of said shaft in either of its two rotational directions, and a controller operatively associated with the said armature mounted on said frame and movable to a plurality of positions regulably limiting the amplitude of vibration of said armature.

9. In an electric motor the combination of an intermittently energized electromagnetic coil, a frame, a pivotally mounted armature acted on by said intermittently energized coil, a shaft rotatably mounted on said frame, a ratchet mounted on said shaft, a pawl mounted to move with said armature and adapted to coact with said ratchet to cause rotation of said shaft, and a controller engaging the said armature and movable into a plurality of positions regulably to limit the amplitude of vibration of said armature.

10. In an electric motor the combination of an intermittently energized electromagnetic coil, a frame, a pivotally mounted armature acted on by said intermittently energized coil, a shaft rotatably mounted on said frame, means actuated by said armature to rotate said shaft, and a controller arm operatively associated with the said armature mounted on said frame and movable into a plurality of positions regulably to limit the amplitude of vibration of said armature.

11. In an electric motor the combination of an intermittently energized electromagnetic coil, a frame, a pivotally mounted armature acted on by said intermittently energized coil, a shaft rotatably mounted in said frame, a ratchet mounted on said shaft, a pawl mounted to move with said armature and adapted to coact with said ratchet to cause rotation of said shaft, said pawl being susceptible of changed positions with respect to said ratchet to produce rotation of the shaft in either of its two rotational directions and a controller engaging the said armature and movable into a plurality of positions regulably to limit the amplitude of vibration of said armature.

12. In an electric motor the combination of an electric circuit including an electromagnetic coil and a contact element, a frame, a pivotally mounted armature acted on by said coil, a resilient circuit breaker mounted to coact with said armature and co-operating with said contact element to make and break said circuit, a shaft rotatably mounted on said frame, a ratchet mounted on said shaft, a pawl movable with said armature adapted to coact with said ratchet to cause rotation of said shaft, said pawl being susceptible of changed positions with respect to said ratchet to produce rotation of the shaft in either of its two rotational directions, a controller movable to a plurality of positions mounted on said frame, said controller engaging said armature in one of said positions to hold said circuit breaker out of contact with said contact element whereby said circuit is maintained open and said controller in other of its said plurality of positions limiting the amplitude of vibration of said armature, and an element engaged with the said controller and arranged in one position of the said controller to act on said ratchet and pawl to reverse the effective relation of said pawl with respect to said ratchet.

13. In an electric motor the combination of an electric circuit including an electromagnetic coil and a contact element, a frame, a pivotally mounted armature acted on by said coil, a resilient circuit breaker arranged to coact with said armature and cooperating with said contact element to make and break said circuit, a shaft rotatably mounted on said frame, a ratchet mounted on said shaft, a pawl movable with said armature adapted to coact with said ratchet to cause rotation of said shaft, said pawl being susceptible of changed positions with respect to said ratchet to produce rotation of said shaft in either of its two rotational directions, a controller mounted on said frame and movable to a plurality of positions regulably limiting the amplitude of vibration of said armature, and an element engaged with the said controller and arranged to act on said ratchet and pawl in one position of said controller to reverse the effective relation of said pawl with respect to said ratchet.

14. In an electric motor comprising a pivoted armature and an electric circuit including an electromagnetic coil arranged to act on said armature, an undulative resilient circuit breaker secured to the armature, and a contact element cooperating with the circuit breaker to make and break said circuit; a movable control means adapted to engage said armature and maintain the same in a position holding said circuit breaker out of contact with said contact element, whereby said circuit may be maintained open.

15. In an electric motor the combination of an electric circuit including an electromagnetic coil and a contact element, a frame, a pivotally mounted armature acted on by said coil, a circuit breaker mounted to coact with said armature and cooperating with said contact element to make and break said circuit, the body of said circuit breaker being of undulate form for decreasing resonance and effecting smooth power transmission, a shaft rotatably mounted in said frame, a ratchet mounted on said shaft, and a pawl movable with said armature adapted to coact with said ratchet to cause rotation of said shaft.

16. In an electric motor the combination of an electric circuit including an electromagnetic coil and a contact element, a frame, a pivotally mounted armature acted on by said coil, an undulative resilient circuit breaker mounted to coact with said armature and cooperating with said contact element to make and break said circuit, a shaft rotatably mounted on said frame, a ratchet mounted on said shaft, a pawl movable with said armature adapted to coact with said ratchet to cause rotation of said shaft, and a controller movable to a plurality of positions engaging said armature in one of said positions to hold said circuit breaker out of contact with said contact element whereby said circuit is maintained open and said controller in other of said plurality of positions limiting the amplitude of vibration of said armature.

17. In an electric motor the combination of an electric circuit including an electromagnetic coil and a contact element, a frame, a pivotally mounted armature acted on by said coil, an undulative resilient circuit breaker mounted to coact with said armature and cooperating with said contact element to make and break said circuit, a shaft rotatably mounted on said frame, a ratchet mounted on said shaft, a pawl movable with said armature adapted to coact with said ratchet to cause rotation of said shaft, and a controller operatively associated with the said armature mounted on said frame and movable to a plurality of positions regulably limiting the amplitude of vibration of said armature.

18. In an electric motor the combination of an electric circuit including an electromagnetic coil and a contact element, a frame, a pivotally mounted armature acted on by said coil, an undulative resilient circuit breaker mounted to coact with said armature and cooperating with said contact element to make and break said circuit, a shaft rotatably mounted on said frame, a ratchet mounted on said shaft, a pawl movable with said armature adapted to coact with said ratchet to cause rotation of said shaft, said pawl being susceptible of changed positions with respect to said ratchet to produce rotation of the said shaft in either of its two rotational directions, and a controller movable to a plurality of positions mounted on said frame, said controller engaging said armature in one of said positions to hold said circuit breaker out of contact with said contact element whereby said circuit is maintained open and said controller in other of its said plurality of positions limiting the amplitude of vibration of said armature.

19. In an electric motor the combination of an electric circuit including an electromagnetic coil and a contact element, a frame, a pivotally mounted armature acted on by said coil, an undulative resilient circuit breaker mounted to coact with said armature and cooperating with said contact element to make and break said circuit, a shaft rotatably mounted on said frame, a ratchet mounted on said shaft, a pawl movable with said armature adapted to coact with said ratchet to cause rotation of said shaft, said pawl being susceptible of changed positions with respect to said ratchet to produce rotation of the shaft in either of its two rotational directions, a controller movable to a plurality of positions engaging said armature in one of said positions to hold said circuit breaker out of contact with said contact element whereby said circuit is maintained open and said controller in other of its said plurality of positions limiting the amplitude of vibration of said armature, and an element engaged with the said controller and arranged in one position of the said controller to act on said ratchet and pawl to reverse the effective relation of said pawl with respect to said ratchet.

CIRO GUAJARDO.

REFERENCES CITED

The following references are of record in the file of this patent:

UNITED STATES PATENTS

| Number | Name | Date |
| --- | --- | --- |
| 1,289,863 | Mitchell | Dec. 31, 1918 |
| 2,432,464 | Abrahamson | Dec. 9, 1947 |

FOREIGN PATENTS

| Number | Country | Date |
| --- | --- | --- |
| 503,588 | Great Britain | Apr. 3, 1939 |